(12) United States Patent
Chen et al.

(10) Patent No.: US 9,400,935 B2
(45) Date of Patent: Jul. 26, 2016

(54) DETECTING APPARATUS OF HUMAN COMPONENT AND METHOD THEREOF

(71) Applicant: Samsung Electronics Co., Ltd., Suwon-si, Gyeonggi-do (KR)

(72) Inventors: Maolin Chen, Beijing (CN); Moon-Sik Jeon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/867,464

(22) Filed: Apr. 22, 2013

(65) Prior Publication Data

US 2013/0236057 A1    Sep. 12, 2013

Related U.S. Application Data

(62) Division of application No. 12/285,694, filed on Oct. 10, 2008, now Pat. No. 8,447,100.

(30) Foreign Application Priority Data

Feb. 4, 2008    (KR) .................. 10-2008-0011390

(51) Int. Cl.
*G06K 9/32* (2006.01)
*G06K 9/00* (2006.01)
*G06K 9/46* (2006.01)

(52) U.S. Cl.
CPC .......... *G06K 9/3241* (2013.01); *G06K 9/00228* (2013.01); *G06K 9/00369* (2013.01); *G06K 9/00375* (2013.01); *G06K 9/46* (2013.01)

(58) Field of Classification Search
CPC ................... G06T 2207/30232; G06T 7/0044; G06T 7/204; G06T 2207/30201; G06T 2207/30196; G06K 9/00228; G06K 9/00369; G06K 9/00375; G06K 9/3241; G06K 9/6256; G06K 9/66; G06K 9/6217; G06K 2209/3291; G06K 9/00597; G06K 9/00355; G08B 13/19602; G08B 13/19608; G08B 13/19606
USPC .................................................. 382/155, 159
See application file for complete search history.

(56) References Cited

U.S. PATENT DOCUMENTS 5,995,663 A * 11/1999 Itsuzaki et al. ........... G06K 9/48
                                                         382/203
6,542,625 B1 * 4/2003 Lee et al. ........... G06K 9/00228
                                                         348/169

(Continued)

OTHER PUBLICATIONS

Notice of Allowance mailed Jan. 25, 2013, in U.S. Appl. No. 12/285,694.

(Continued)

*Primary Examiner* — Edward Park
(74) *Attorney, Agent, or Firm* — NSIP Law

(57) ABSTRACT

Disclosed are an apparatus and a method of detecting a human component from an input image. The apparatus includes a training database (DB) to store positive and negative samples of a human component, an image processor to calculate a difference image for the input image, a sub-window processor to extract a feature population from a difference image that is calculated by the image processor for the positive and negative samples of a predetermined human component stored in the training DB, and a human classifier to detect a human component corresponding to a human component model using the human component model that is learned from the feature population.

12 Claims, 15 Drawing Sheets

(56) References Cited

U.S. PATENT DOCUMENTS

| | | | |
|---|---|---|---|
| 6,728,404 B1* | 4/2004 | Ono et al. | G06K 9/3241 382/118 |
| 7,095,878 B1* | 8/2006 | Taylor et al. | G06K 9/00275 382/118 |
| 7,110,023 B2* | 9/2006 | Utsumi et al. | G06K 9/00362 348/169 |
| 2003/0142209 A1* | 7/2003 | Yamazaki et al. | 348/143 |
| 2003/0190058 A1* | 10/2003 | Jun et al. | G06K 9/3241 382/104 |
| 2005/0013479 A1 | 1/2005 | Xiao et al. | |
| 2005/0220336 A1 | 10/2005 | Sabe et al. | |
| 2006/0147108 A1* | 7/2006 | Kee et al. | 382/159 |
| 2006/0171586 A1 | 8/2006 | Georgescu et al. | |
| 2006/0204034 A1* | 9/2006 | Steinberg et al. | 382/103 |
| 2007/0165951 A1* | 7/2007 | Akahori et al. | 382/195 |
| 2007/0263904 A1* | 11/2007 | Muramatsu | 382/107 |
| 2007/0292019 A1 | 12/2007 | Terakawa | |

OTHER PUBLICATIONS

Non-Final Office Action mailed Aug. 1, 2012, in U.S. Appl. No. 12/285,694.

Restriction Requirement mailed Jun. 13, 2012, in U.S. Appl. No. 12/285,694.

U.S. Appl. No. 12/285,694, filed Oct. 10, 2008, Maolin Chen et al., Samsung Electronics Co., Ltd.

* cited by examiner

DETECTING APPARATUS OF HUMAN COMPONENT AND METHOD THEREOF

CROSS-REFERENCE TO RELATED APPLICATIONS

This application is a Divisional application of Ser. No. 12/285,694, filed Oct. 10, 2008, which claims the benefit of Chinese Patent Application No. 200710163908.4, filed on Oct. 10, 2007 in the State Intellectual Property Office of the People's Republic of China, and of Korean Patent Application No. 10-2008-0011390, filed on Feb. 4, 2008 in the Korean Intellectual Property Office, the disclosures of all of which are incorporated herein by reference.

BACKGROUND

1. Field

The present invention relates to an apparatus and method for detecting an object. In particular, the present invention relates to an apparatus and method for detecting a human component and an apparatus and method for detecting an object using a difference image as a feature image.

2. Description of the Related Art

Object detection is very important in video analysis technology, such as content-based video or image object retrieval, video surveillance, object recognition, frequency control, video compression and automatic driver-assistance. In the real world, a human being is one of the most challenging categories for detection. Human detection can be divided into three types of cases.

The first case is when an object detection system determines whether there is a man in a field. For example, in the case the object detection system is for driving assistance, when a pedestrian on a road is near a vehicle, the system generates an alarm to alert a driver. This may be implemented as an embedded smart device integrated with an imaging apparatus.

The second case is coherent tracking of an individual person in a static camera or a PTZ camera. The static camera may collect moving trajectories of the person, and apply the same to intelligent behavior analysis and the PTZ camera may adjust its position to track and center the person in an image and record detail or behaviors.

The third case is when a robot performs tracking of a person, observing the person, or interacting with the person. The robot will attempt to detect the person's position in the image of its camera, and perform corresponding actions, such as moving, tracking, observing, or adjusting its position, which can be implemented by an embedded device integrated into a functional apparatus of the robot.

Because a partial appearance and overall shape varies due to various fashion shapes and styles, it is relatively difficult to find a feature included in a category. Thus, a feature population having stability and capable of being identified even under poor surroundings to extract a feature, such as poor lightning and a complex background, is needed. In addition, the overall shape varies due to accuracy and many occluding accessories and silhouettes are modified due to many people present in the same image region. Thus, an algorithm is needed through which a small amount of interference from an overall recorded image may be overcome and accurate result may be drawn.

A conventional human detection method uses either a global model such as full-body appearance or silhouettes, or a local feature population or a component detecting apparatus. The first method extracts features of full-body human and builds the global models based on its appearance or silhouettes. The second method segments a human body into several components, such as a human head, human torso, human legs and arms. Human detection is seen as component detection, and research subjects are focused on simplifying a corresponding human component model. Pattern learning methods generally include schemes such as support vector machine (SVM), Adaboost, and the like.

As is well known, face detection has made significant progress in the past few years, and achieves high detection rates and low false alarm rates in real-time processing. However, human detection still requires many advances to be realized for application in the real-world. First, a human detecting apparatus should be able to adapt itself to changes of human appearance due to different clothing style and different illumination conditions. Second, the human detecting apparatus should be built on robust features which capture characteristic patterns of humans from their various deformations. Finally, the human detecting apparatus should require relatively fewer computations and real-time processing capability.

SUMMARY

Additional aspects and/or advantages will be set forth in part in the description which follows and, in part, will be apparent from the description, or may be learned by practice of the invention.

An aspect of the present invention provides a human component detecting method and an apparatus having stable identification capability and real-time processing capability.

Another aspect of the present invention provides an object detecting method and an apparatus having stable identification capability and real-time processing capability.

Another aspect of the present invention provides an image forming system having stable identification capability and real-time processing capability.

According to an aspect of the present invention, there is provided an apparatus for detecting a human component from an image including: a training database (DB) to store positive and negative samples of the human component; an image processor to calculate a difference image of an input image; a sub-window processor to extract a feature population from a difference image that is calculated for the positive and negative samples of a predetermined human component stored in the training DB; and a human component classifier to detect a human component corresponding to a human component model using the human component model, wherein the human component model is learned from the feature population.

According to another aspect of the present invention, there is provided a method of detecting a human component from an image including: storing positive and negative samples of a human component and extracting a feature population from a difference image of the positive and negative samples; learning a human component model from the extracted feature population; and calculating difference images and detecting a corresponding human component from the difference images using the human component model.

According to still another aspect of the present invention, there is provided an apparatus for detecting an object from an image including: a training DB to store positive and negative samples of an object; an image processor to calculate a difference image of an input image; a sub-window processor to extract a feature population from a difference image that is calculated for the positive and negative samples of an object stored in the training DB; and an object classifier to detect an object corresponding to an object model using the object model, wherein the object model is learned from the feature population.

According to yet another aspect of the present invention, there is provided a method for detecting an object from an image including: storing positive and negative samples of an object and extracting a feature population from a difference image of the positive and negative samples; learning an object model from the extracted feature population; and calculating difference images of an input image and detecting a corresponding object from the difference images using the object model.

According to a further aspect of the present invention, there is provided an image forming system including: a photographing apparatus to photograph an image of an object; a detecting apparatus to detect a region of the object corresponding to an object model using the object model, wherein the object model is learned from a feature population extracted from a difference image of positive and negative samples of the object; a status parameter computing apparatus to compute parameters based on the detected object region where the object exist in the image of the object, so as to enable the object to be in the central region of the image; a controller to receive the status parameters and adjust the status of the image; a storing apparatus to store the image of the object; and a display apparatus to display the image of the object.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF EMBODIMENTS

Figure 1:
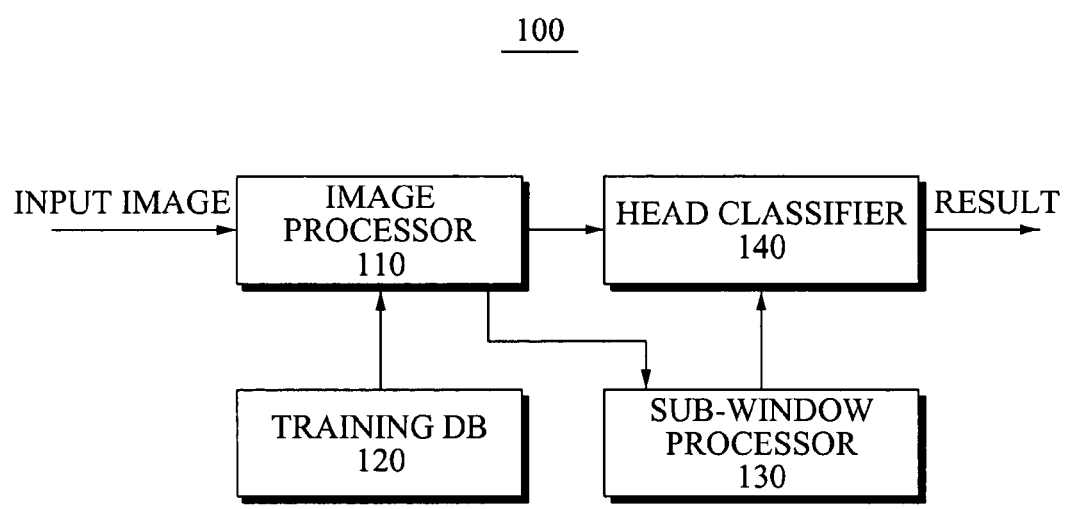
FIG. 1 illustrates a structure of a head detecting apparatus among human component detecting apparatus according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 illustrates a structure of a head detecting apparatus 100 of a human component detecting apparatus according to an exemplary embodiment of the present invention.

Referring to FIG. 1, the head detecting apparatus 100 includes an image processor 110, a training database (hereinafter 'DB') 120, a sub-window processor 130 and a head classifier 140.

The image processor 110 calculates difference images of all input images. The image processor 110 calculates a real-time input image, and also sample images stored in a training DB stores.

The training DB 120 stores positive and negative samples of human component, wherein since the human component is a human head, the DB 120 stores positive and negative samples of human head.

The sub-window processor 130 extracts a feature population using a difference image that is calculated by the image processor 110 for positive and negative samples of human head stored in the training DB 120.

The head classifier 140 learns a human head model from the feature population and detects a human head region from a new difference image that is calculated for an input image of the image processor 110 by the image processor 110.

Figure 8:
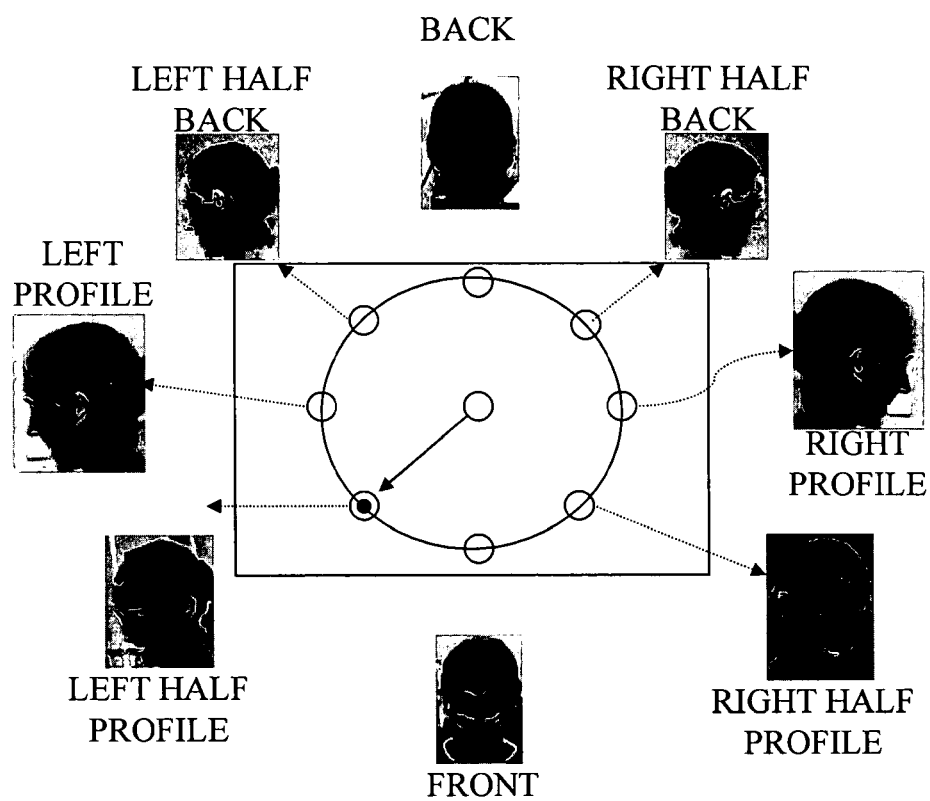
FIG. 8 illustrates classification of a human head according to a variety of views.
Figure 9:
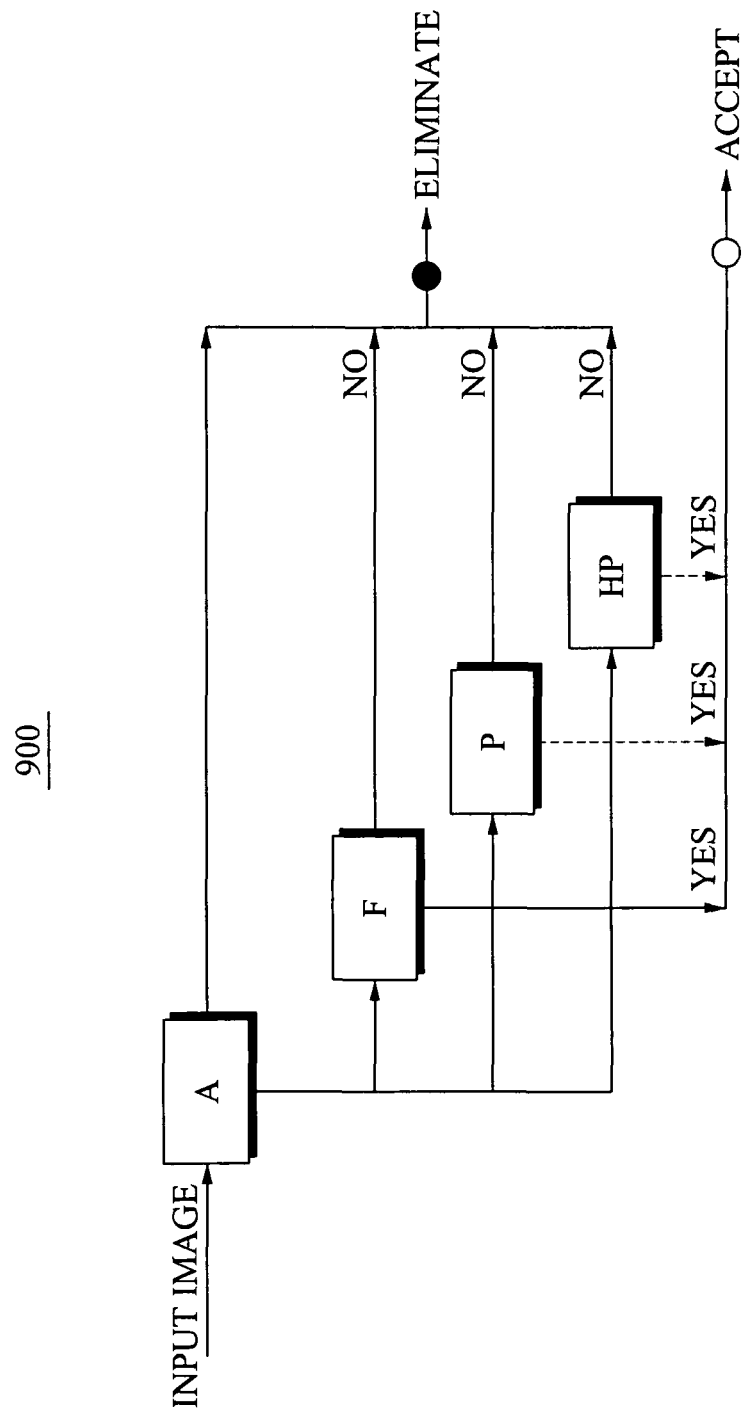
FIG. 9 shows a pyramid classifier for a human head.

As one skilled in the art may easily understand, the head classifier 140 illustrated in FIG. 1 is only one example. In particular, the head classifier 140 of the head detecting apparatus 100 may be replaced with other human component classifiers such as a human torso classifier, a human legs classifier, a human arms classifier, a human full body classifier, and the like. Therefore, according to the above description, other human component detecting apparatus may be implemented to detect other human components from an image. Also, the head classifier 140 of FIG. 1 may be in a form of a pyramid classifier 900 for a human head as illustrated in FIG. 9, wherein the human head may be classified according to a variety of views as illustrated in FIG. 8.

In this manner, a human component detecting apparatus may be implemented by including an image processor, a training DB, a sub-window processor, and a human component classifier. In this case, each human component detecting apparatus may be implemented by either including all the above-described four elements or including only a human component classifier according to each human component and jointly using other elements, such as an image processor, a training DB, and a sub-window processor.

Figure 2:
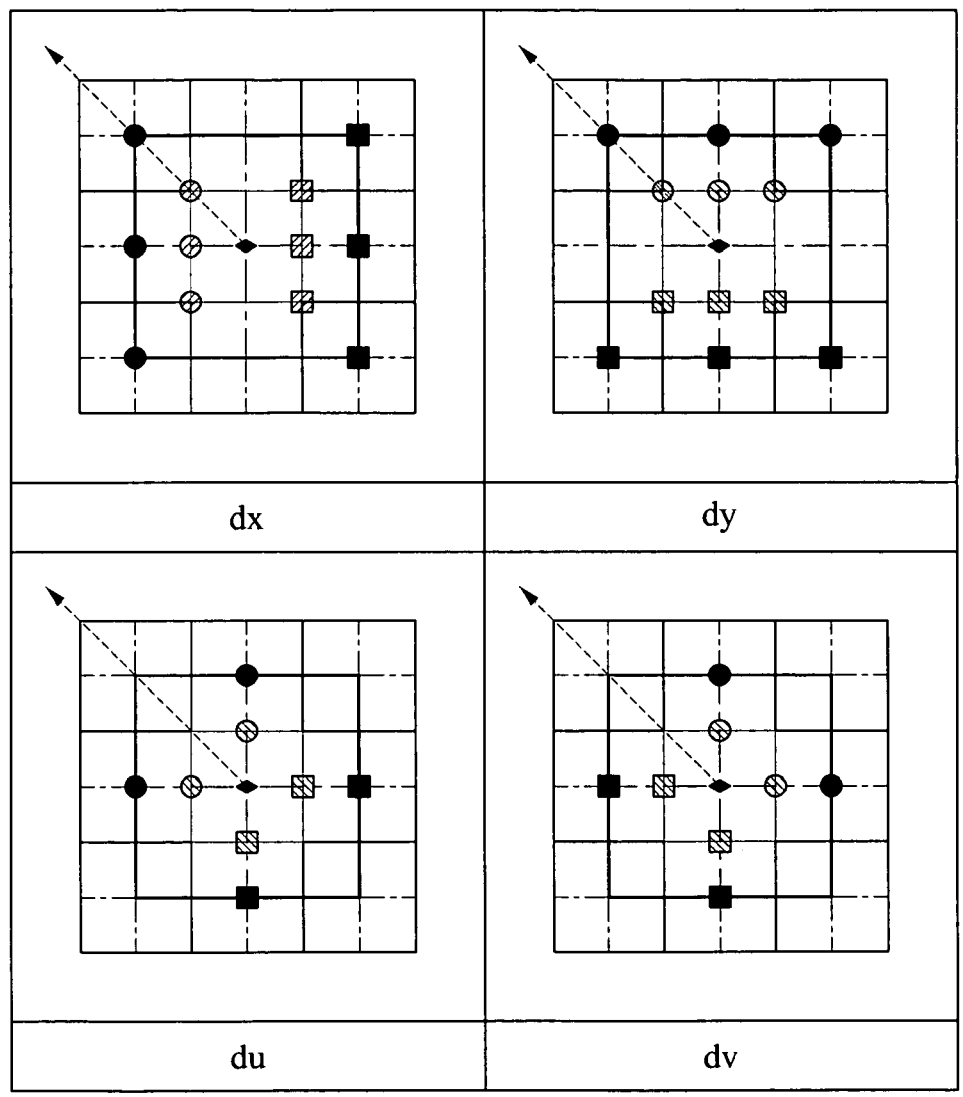
FIG. 2 illustrates how an image processor calculates difference images according to an exemplary embodiment of the present invention.

FIG. 2 illustrates how an image processor calculates difference images according to an exemplary embodiment of the present invention.

Referring to FIG. 2, the image processor 110 calculates four difference images of dx, dy, du and dv. Each pixel value of the first difference image dx is pixel difference in a horizontal direction of an N*N neighboring area. Referring to the first difference image dx of FIG. 2, when N is 3, a sum of pixel values of gray rectangles minus a sum of pixel values of gray circles is a center pixel value of the first difference image dx.

Each pixel value of the second difference image dy is a pixel difference in a vertical direction of an N*N neighboring area. Referring to the second difference image dy of FIG. 2, when N is 3, a sum of pixel values of gray rectangles minus a sum of pixel values of gray circles is a center pixel value of the second difference image.

Each pixel value of the third difference image du is pixel difference in a right-left diagonal direction of an N*N neighboring area. Referring to the third difference image du of FIG. 2, when N is 3, a sum of pixel values of gray rectangles minus a sum of pixel values of gray circles is a center pixel value of the third difference image.

Each pixel value of the fourth difference image dv is a pixel difference in a left-right diagonal direction of an N*N neighboring area to a source image. Referring to the fourth difference image dy of FIG. 2, when N is 3, a sum of pixel values of gray rectangles minus a sum of pixel values of gray circles is a center pixel value of the fourth difference image. In this way, each pixel value of the first to fourth difference images dx, dy, du, dv represents average gray changes of pixels in a designated orientation of a neighboring area.

Additionally, a difference image may be calculated with different scales. For example, in the first to fourth pixel values, dx, dy, du and dv of FIG. 2, a sum of pixel values of black rectangles minus the sum of pixel values of black circles is a center pixel value of a 5*5 neighboring area. A pixel value of a neighboring area may be formulated as (2*n+1)*(2*n+1), n=1, 2 . . . .

Also, an image is sub-sampled with multiple scales, for example, when n is 2, difference images of each pixel is drawn to perform a calculation once. For a low resolution image, difference images are calculated with a large scale, specifically, by setting a relatively large neighboring area so as to reduce effects of background noise when extracting features. Conversely, for a high resolution image, difference images are calculated with a small scale, specifically, by setting relatively small neighboring area so as to represent pixel value in detail.

For example, for an image of w (0 . . . w−1) pixel width and h(0 . . . h−1) pixel height, difference images are calculated from 1 to w−2 in width and 1 to h−2 in height, and pixel values outside an image border set to zero. Before difference images with a large scale are calculated, a source gray image is sub-sampled. Then feature difference images are computed according to the above-described method.

Figure 3:
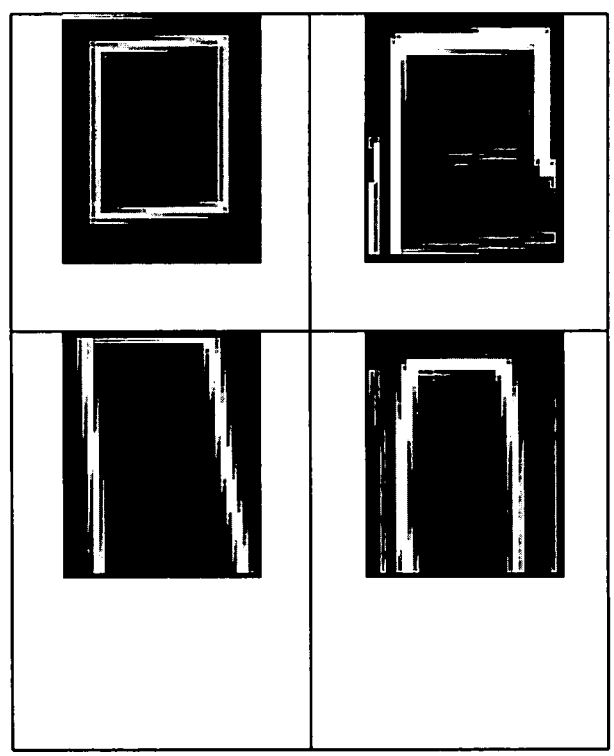
FIG. 3 shows typical negative samples which have similar contour shape to positive head samples.

FIG. 3 shows typical negative samples which have similar contour shape to positive head samples.

Referring to FIG. 3, although negative samples are similar to a linear structure of a rectangle, the negative samples look like a deformed shape of human heads. An capability of a classifier may be tested through the negative sample, since a false alarm occurring in detection results generally includes objects being similar to human heads. In another aspect, it indicates importance of feature transformation and extraction. The disclosed invention provides a method that alleviates difficulties of feature extraction.

Figure 4:
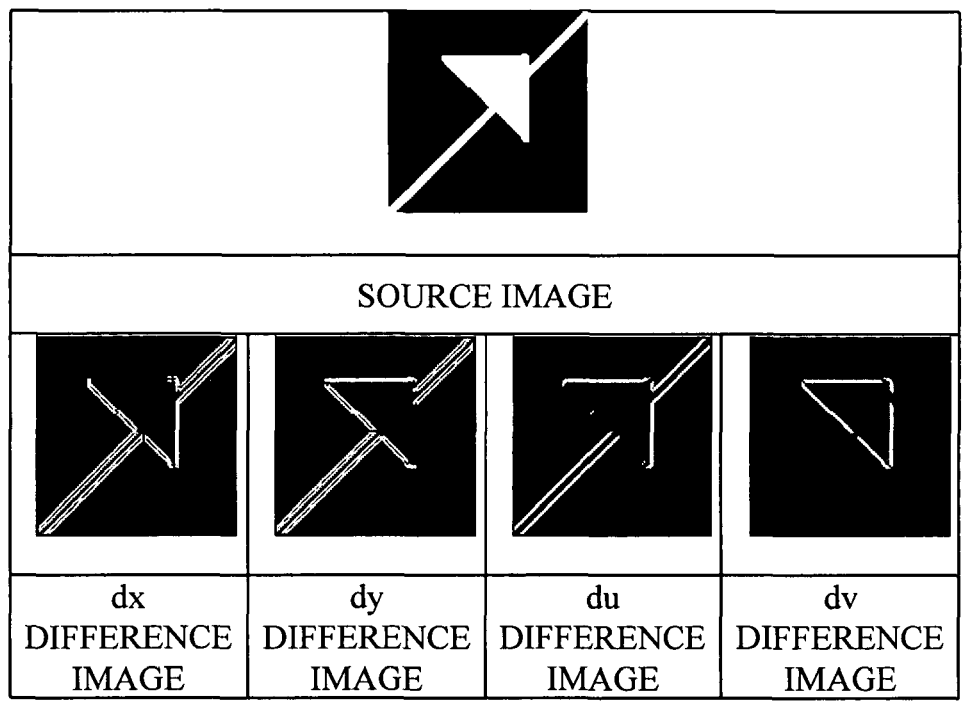
FIG. 4 shows difference images of an object with strong straightforward lines.

FIG. 4 shows difference images of an object with strong straightforward lines.

Referring to FIG. 4, the objects with strong straightforward lines in an image may be classified into different difference images. This classification may provide a relatively good source for feature extraction. A first difference image dx keeps image changes in a horizontal direction, and a second difference image dy keeps image changes in a vertical direction. A third and a fourth difference image du and dv keep image changes in a diagonal direction.

Figure 5:
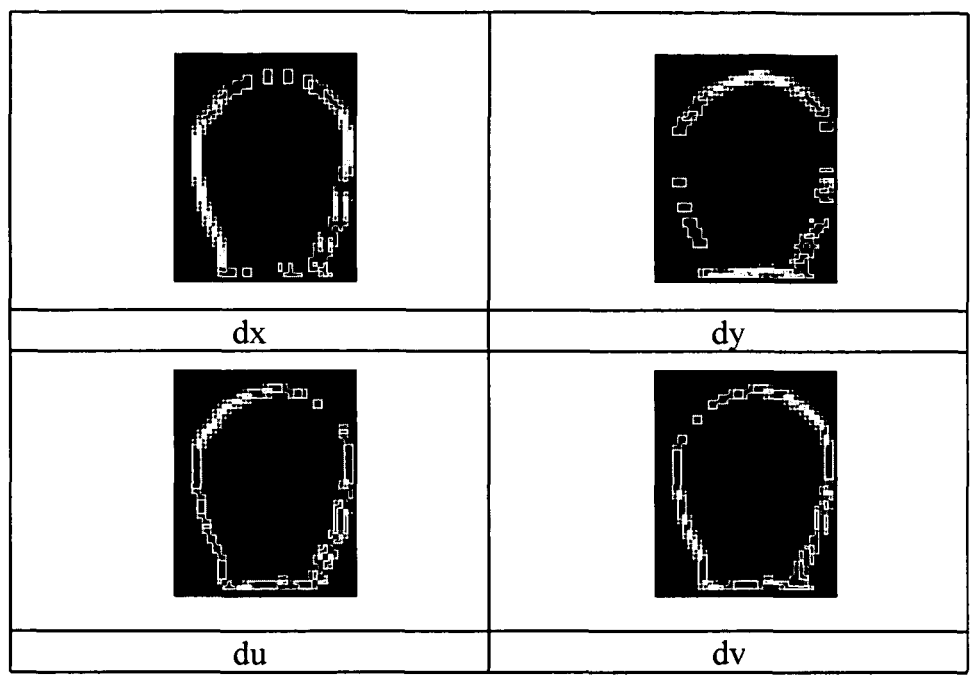
FIG. 5 shows four examples (dx, dy, du, dv) of difference images of a human head calculated according to the method of FIG. 2.

FIG. 5 shows four examples (dx, dy, du, dv) of difference images of a human head calculated according to the method of FIG. 2. Comparing with difference images in FIG. 4, although lines of difference images in FIG. 3 are decomposed, head contours in FIG. 5 are relatively well kept.

Figure 6:
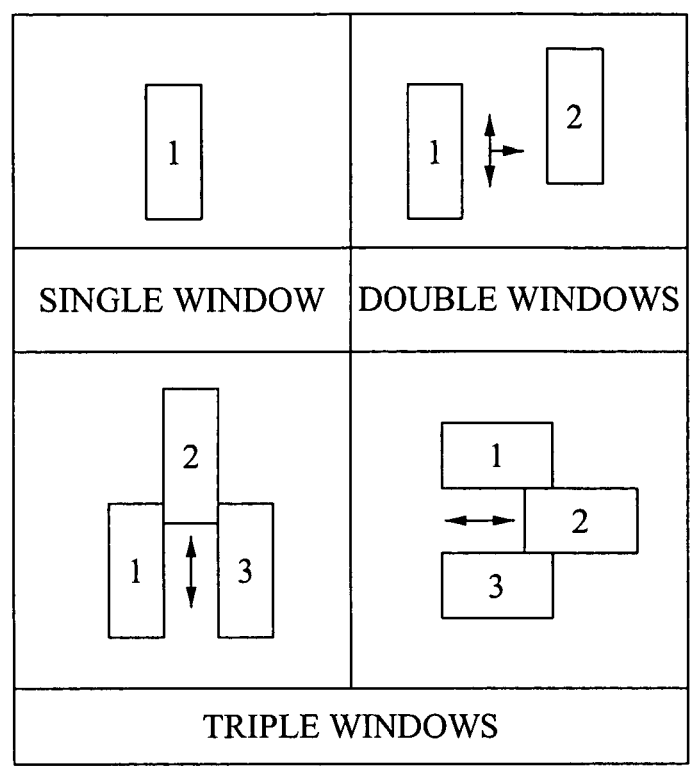
FIG. 6 illustrates a sub-window used in a sub-window processor in a feature extracting method according to an exemplary embodiment of the present invention.

FIG. 6 illustrates a sub-window used in a sub-window processor in a feature extracting method according to an exemplary embodiment of the present invention;

A feature of a single window is created by sliding the single window on a training image while varying its width and height in an adjustable scale according to an image scale. Then, a feature of double windows is created by varying width and height of the double windows in an adjustable scale according to the image scale and at the same time, varying the width and height of the double windows using the same zoom parameters, and sliding the double windows on the image so as to capture a wide-range hidden pattern according to the scale. The double windows slide relative to each other in a horizontal direction and in a vertical direction to capture a wide-range hidden pattern.

A feature of triple windows is created by sliding the connected triple windows on a sample. The triple windows have the same width and height as each other while varying their scales for capturing a wide-range pattern according to the scale. A second window of the triple windows captures convex and concave contours from movement of a first window and a third window. There are two kinds of triple windows features. One is horizontal layout of three windows, and the other is vertical layout of three windows. For the horizontal layout, the second window horizontally and relatively slides between the first and third windows and for the vertical layout, the second window vertically and relatively slides between the first and the third windows.

It is assumed that f is extracted feature, G is a difference image, w is a feature window, and $OP^1$ is a first operator used in features extraction. The $OP^1$ is the first operator including '+' and '−' which are two simple operators, namely, $OP^1=\{+,-\}$. $OP^2$ is a second operator used in the disclosed invention including '+', '−' and a dominant operator domi, represented as $OP^2=\{+, -, domi\}$.

For feature extraction of a single difference image, a feature may be calculated by Equations 1, 2 and 3 respectively corresponding to a single window feature, a double windows feature and a triple windows feature. a may be one of the four difference images.

$$f_1^a = \sum_{(i,j) \in w_1} G_a(i, j) \qquad \text{[Equation 1]}$$

$$f_2^a = (OP^1)\left(\sum_{(i,j) \in w_1} G_a(i, j), \sum_{(i,j) \in w_2} G_a(i, j)\right), \qquad \text{[Equation 2]}$$

-continued $$f_3^a = (OP^1)\left(\sum_{(i,j)\in w_1} G_a(i,j), \sum_{(i,j)\in w_2} G_a(i,j), \sum_{(i,j)\in w_3} G_a(i,j)\right).$$ [Equation 3]

For feature extraction of double difference images, a feature can be calculated by Equations 4, 5, and 6 corresponding to a single window feature, a double windows feature, and a triple windows feature of a difference image. a and b can be any two of four difference images.

$$f_1^{ab} = (OP^2)(f_1^a, f_1^b)$$ [Equation 4]

$$f_2^{ab} = (OP^2)(f_2^a, f_2^b)$$ [Equation 5]

$$f_3^{ab} = (OP^2)(f_3^a, f_3^b)$$ [Equation 6]

For feature extraction of triple difference images, feature can be calculated by Equations 7, 8 and 9 respectively corresponding to a single window feature, a double windows feature, and a triple windows feature. a, b and c can be any three of four difference images.

$$f_1^{abc} = (OP^2)(f_1^a, f_1^b, f_1^c)$$ [Equation 7]

$$f_2^{abc} = (OP^2)(f_2^a, f_2^b, f_2^c)$$ [Equation 8]

$$f_3^{abc} = (OP^2)(f_3^a, f_3^b, f_3^c)$$ [Equation 9]

For features extraction of quadruple difference images, feature is calculated by Equations 10, 11 and 12 respectively corresponding to single window feature, double windows feature, and triple windows feature a, b, c and d are four difference images.

$$f_1^{abcd} = (OP^2)(f_1^a, f_1^b, f_1^c, f_1^d)$$ [Equation 10]

$$f_2^{abcd} = (OP^2)(f_2^a, f_2^b, f_2^c, f_2^d)$$ [Equation 11]

$$f_3^{abcd} = (OP^2)(f_3^a, f_3^b, f_3^c, f_3^d)$$ [Equation 12]

As shown in Equation 13 through 17, the first operator $OP^1$ is a summation and a subtraction operator, and the second operator $OP^2$ is a summation and a subtraction operator, and also a dominant operator.

$$OP^1(a,b) = (a+b) \text{ or } (a-b)$$ [Equation 13]

$$OP^2(a,b) = (a+b) \text{ or } (a-b) \text{ or } \left(\frac{a}{a+b}\right) \text{ or } \left(\frac{b}{a+b}\right)$$ [Equation 14]

$$OP^1(a,b,c) = (a+b+c) \text{ or } (2b-a-c)$$ [Equation 15]

$$OP^2(a,b,c) = (a+b+c)$$
$$OP^2(a,b,c) = 2b-a-c$$
$$OP^2(a,b,c) = \frac{a \text{ or } b \text{ or } c}{a+b+c}$$ [Equation 16]

$$OP^2(a,b,c,d) = (a+b+c+d)$$
$$OP^2(a,b,c,d) = 3a-b-c-d$$
$$OP^2(a,b,c,d) = 3b-a-c-d$$
$$OP^2(a,b,c,d) = 3c-a-b-d$$
$$OP^2(a,b,c,d) = 3d-a-b-c$$
$$OP^2(a,b,c,d) = \frac{a,b,c \text{ or } d}{a+b+c+d}$$ [Equation 17]

The sub-window used in the method of extracting features as shown in FIG. 6 should be considered in a descriptive sense only and is not for limiting the purposes of the invention. The present invention may be implemented through a variety of number and types of sub-windows.

The sub-window processor 130 may extract a feature by scanning a single difference image, double difference images, triple difference images, or quadruple difference images. The feature population may be either a feature extracted from one of the single difference image, the double difference images, the triple difference images, and the quadruple difference images, or an arbitrary combination of features respectively extracted from the single difference image, the double difference images, the triple difference images, and the quadruple difference images. Furthermore, in order to acquire more features, the difference images may be calculated with different scales and may extract a feature population from the difference image calculated with the different scale.

A final classifying model is generated by selecting an identifiable feature using statistical learning methods, such as an Adaboost method, SVM, and the like, for the extracted feature population. The above-described model classification technology among a variety of pattern recognition technologies is applicable to a classifier.

Figure 7:
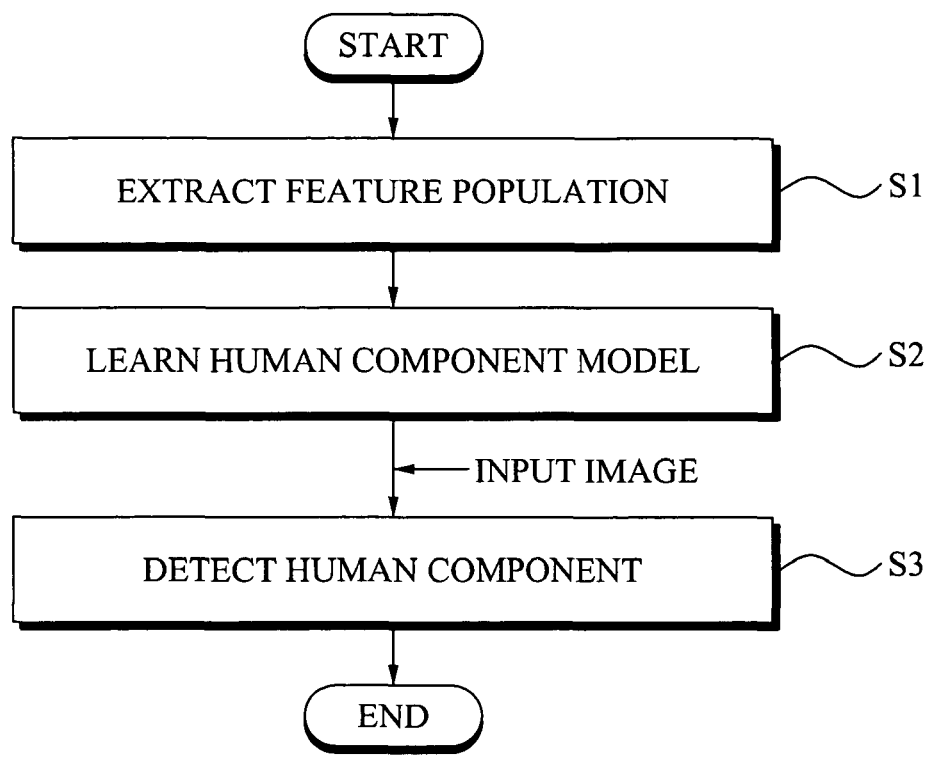
FIG. 7 is a flowchart illustrating a human component detecting method according to an exemplary embodiment of the present invention.

FIG. 7 is a flowchart briefly illustrating a human component detecting method according to an exemplary embodiment of the present invention.

Referring to FIG. 7, there is provided a method of detecting a human component according to an exemplary embodiment of the present invention. First of all, the present invention stores positive and negative samples of a human component, calculating a difference image of the samples and extracting a feature population based on the calculated difference images in operation S1.

In operation S2, a human component model corresponding to the human component is built using a statistical learning method. Through the human component model, a human component classifier that uses the human component model is obtained. For example, upon storing positive and negative samples of torsos for a torso, the present invention performs extracting a feature population using the above described feature extracting method for the positive and negative samples of the torsos. Then, the present invention selects an identifiable feature using a statistical learning method and finally builds a torso model and a classifier that encodes the torso model In operation S3, the present invention detects a corresponding human component from difference images of an input image using the human component model.

FIG. 8 illustrates classification of a human head according to a variety of views;

Referring to FIG. 8, as an angle of camera toward the human head is changed, contour shapes in various viewing angle is classified into views in eight direction as shown in FIG. 8, namely front, left half profile, left profile, left half back, back, right half back, right profile and right half profile. Eight classified views represent a full 360 degree view around a human head. Each image view covers a predetermined range of view angle, but is not limited in a specific view angle. For example, although the front image is denoted as 0 degrees and left profile is denoted as 90 degrees, actually the front image covers [−22.5, +22.5] degrees, the left half profile image covers [22.5, 67.5] degrees and the left profile image covers [67.5, 112.5] degrees.

FIG. 9 shows a pyramid classifier 900 for a human head.

A pyramid detecting apparatus 900 illustrated in FIG. 9 includes a first, second, third and fourth classifier A, F, P and HP which encodes a human component model corresponding to each feature population extracted from a difference image for positive and negative samples of eight divisions of the human head as shown in FIG. 8 so as to detect a human component for an input image.

That is, the pyramid classifier 900 including: a first head model and a first head classifier A using the first head model is learned based on a feature population extracted from a difference image for the positive and negative samples of the front, left half profile, left profile, left half back, back, right half back, right profile and right half profile of the human head; a second head model and a second head classifier F using the first head model is learned based on a feature population extracted from a difference image for the positive and negative samples of the front and back of the human head; a third head model and a third head classifier P using the third head model is learned based on a feature population extracted from a difference image for the positive and negative samples of the left profile and right profile of the human head; and a fourth head model and a fourth head classifier HP using the fourth head model is learned based on a feature population extracted from a difference image for the positive and negative samples of the left half profile, left half back, right half back and right half profile of the human head.

In detecting, an image processor (not shown) first calculate four difference images in a horizontal direction, vertical direction, left-right diagonal direction and right-left diagonal direction with respect to the input image, then the first classifier A outputs the difference images, and the first classifier to the fourth classifier sequentially search and test every possible scale and position in the difference images. In the test, a difference image that passes evaluation of the pyramid detecting apparatus 900 is determined as a human head candidate. Otherwise, the difference image is rejected and are considered as being a false alarm.

In particular, the first classifier A first searches and tests every possible scale and position. That is, the first classifier A detects a human head region and the detected human head region is evaluated by the second to fourth classifier F, P and HP. When a human head region sample is accepted by one of the second to fourth classifier F, P and HP, the human head region sample is determined as a candidate of an human head image corresponding to each of the second to fourth classifier. Each of the second to the fourth classifier F, P and HP gradually evaluates the samples that the classifier A accepts, and completes evaluation for all the samples that the classifier A accepts.

Figure 10:
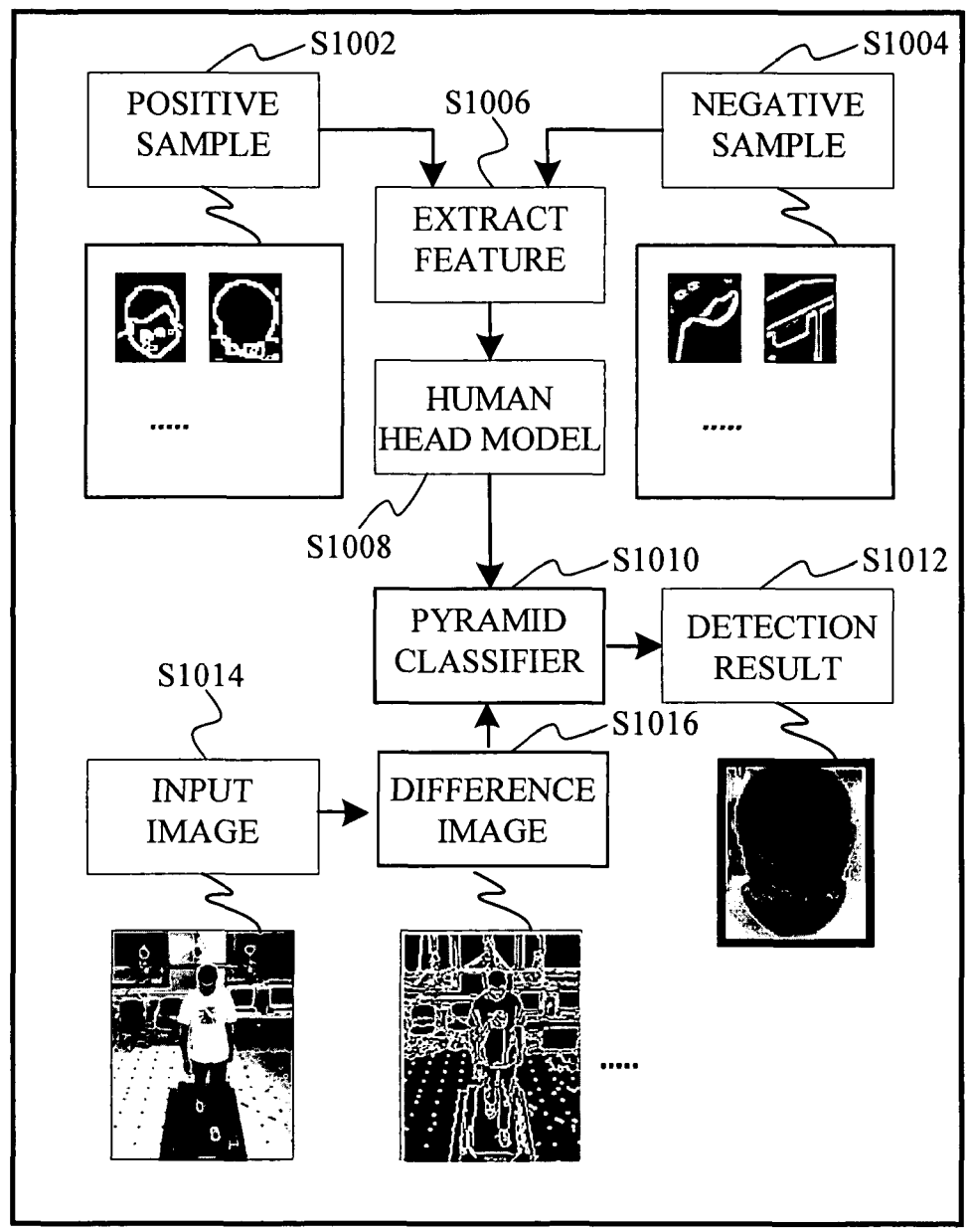
FIG. 10 is a flowchart illustrating detection by the pyramid detecting apparatus of FIG. 9 to explain a human component detecting method according to an exemplary embodiment of the present invention.

FIG. 10 is a flowchart illustrating detection by the pyramid detecting apparatus 900 of FIG. 9 to explain a human component detecting method according to an exemplary embodiment of the present invention.

Referring FIG. 10, there is provided a human head detecting method including: storing positive S1002 and negative samples S1004 of the front, left half profile, left profile, left half back, back, right half back, right profile, and right half profile of a human head, and then extracting a feature S1006 from a difference image of the positive and negative samples of the front, left half profile, left profile, left half back, back, right half back, right profile, and right half profile of a human head.

As described above, a first head model is learned from every view angle of a human head; a second head model is learned from a feature population extracted from a difference image of the positive and negative samples of the front and back of a human head; a third head model is learned from a feature population extracted from a difference image of the positive and negative samples of the left profile and right profile of a human head; and a fourth head model is learned from a feature population extracted from a difference image of the positive and negative samples of the left half profile, left half back, right half back, and right half profile of a human head S1008.

Each of the first to fourth classifier of pyramid detecting apparatus 900 respectively uses a first, a second, a third, and a fourth head model S1010. In the detecting, four difference image of an input image S1014 is first calculated in a horizontal direction, vertical direction, left-right diagonal direction and right-left diagonal direction S1016. Then, the pyramid detecting apparatus 900 detects a human head from an input image and transmits the detected human head as a detection result S1012.

A human component detecting apparatus according to another exemplary embodiment of the present invention uses at least one human component classifier besides a human head, such as human torso, human legs, and human arms classifier and eliminates false alarms of a human head determined by the pyramid detecting apparatus 900 illustrated in FIG. 9 so as to improve accuracy of human head detection. Moreover, a human head detecting apparatus according to an exemplary embodiment of the invention may be used as a human detecting apparatus, since the existence of a person can be determined when a human head is detected.

Figure 11:
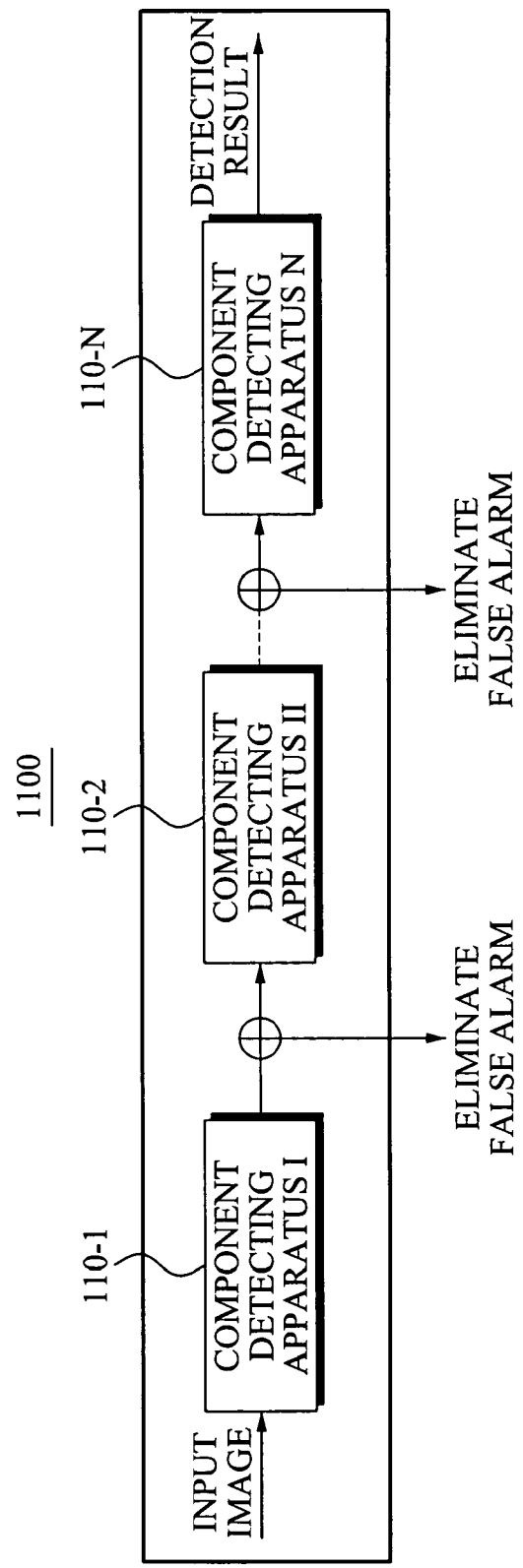
FIG. 11 is a configuration diagram of a human detecting apparatus wherein multiple human component detecting apparatus sequentially aligned according to an exemplary embodiment of the present invention.

FIG. 11 is a configuration diagram of a human detecting apparatus 1100 wherein multiple human component detecting apparatus are sequentially aligned according to an exemplary embodiment of the present invention.

Referring to FIG. 11, the human detecting apparatus 1100 includes an N number of component detecting apparatus sequentially aligned one of which is a main detecting apparatus. The human detecting apparatus 1100 is used to detect a human component corresponding to the main detecting apparatus in an input image. In this exemplary embodiment of the present invention, a first component detecting apparatus I is used as a main detecting apparatus.

Hereafter, operation of the human component detecting apparatus 1100 will be described. First, a detected input image is inputted into the first component detecting apparatus I 110-1. The first component detecting apparatus I 110-1 detects a region corresponding to a first human component I 110-1 in the input image.

Then a second component detecting apparatus II 110-2 detects a region corresponding to a second human component II. According to the human body geometry, some first human component candidates outputted from the first component detecting apparatus I 110-1 are rejected and are considered as being false alarms based on the second human component region II detected by the second component detecting apparatus II 110-2 and some of second human component candidates are rejected as false alarms at the same time, so that the second human component II remains.

In this manner, other component detecting apparatus (not shown) eliminate some candidates that are not a human component corresponding to each input image and are considered as being false alarms, and transmits remaining human component (not shown) to a next component detecting apparatus.

An N component detecting apparatus N 110-N detects a region corresponding to an $N^{th}$ human component N in an input image. In this case, according to the human body geometry, some of the first human component I candidates evaluated by the second component detecting apparatus II are eliminated and are considered as being false alarms based on the Nth human component N region detected by the N component detecting apparatus, and some of the second to the $N-1^{th}$ component II, . . . , and N−1 candidates and $N^{th}$ component N candidates are eliminated and are considered as being false alarms. Then a component candidate of the remaining first human component I and a second to the $N-1^{th}$ component II, . . . , and N−1 candidate and a $N^{th}$ component N candidate that matching the remaining the first human component I may be obtained.

Thus, comparing with detection using only the first component detecting apparatus I, detection of the first human component I using multiple human component detecting apparatus is more accurate. Also, in this manner, a human component may be detected in an image by using a multiple human components detecting apparatus according to human body geometry and other human components.

The second component detecting apparatus II 110-2 acts as a verifier of a component candidate from the first component detecting apparatus I 110-1. In this instance, the second component detecting apparatus II 110-2 scans an area adjacent to the component candidate of the first component detecting apparatus I 110-1, so as to detect the second component. The adjacent area is determined based on human body geometry. For example, when the first component detecting apparatus I 110-1 is a head detecting apparatus, the second component detecting apparatus II 110-2 is a torso detecting apparatus. In this case, an accurate head component candidate from head component candidates of the first component detecting apparatus may be obtained by initially determining scan space based on relative position and size of a torso. In other words, an accurate head component candidate from head component candidates of the first component detecting apparatus may be obtained by determining a position and size of the torso in an image and performing statistical analysis.

In the present invention, the number of component detecting apparatus in the human component detecting apparatus 1100 is not limited to a specific number, and the human component detecting apparatus 1100 may comprise required component detecting apparatus according to need. The component detecting apparatus may be a human head, human torso, human legs, human arms or a portion of a human body detecting apparatus.

Figure 12:
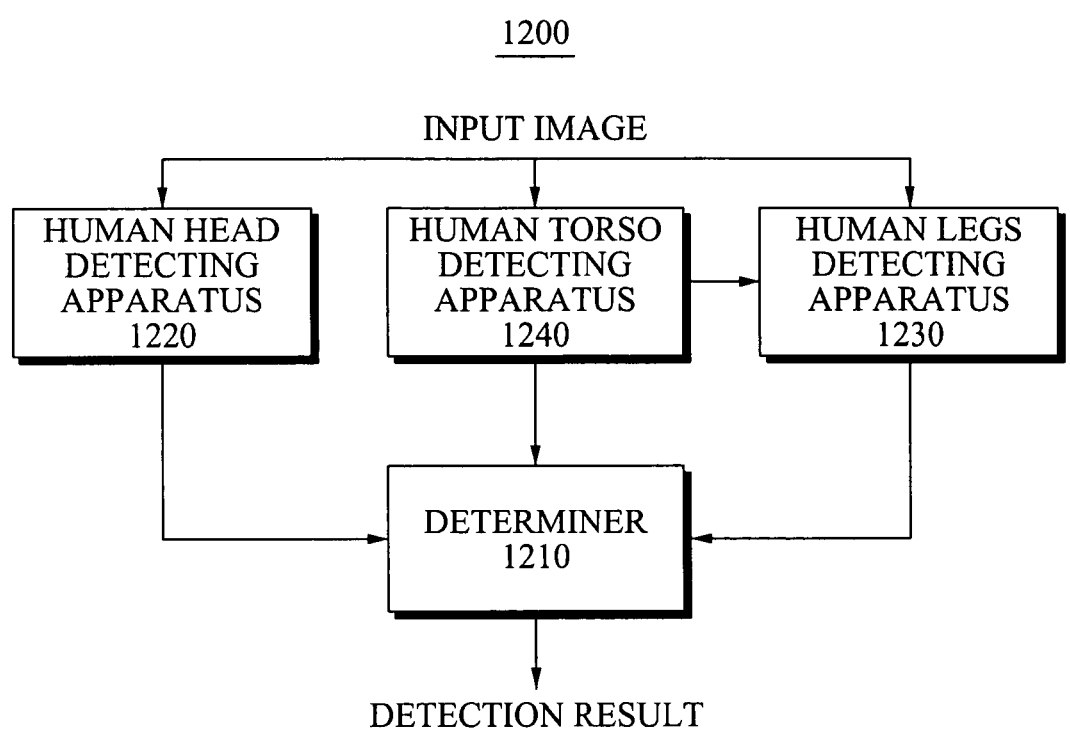
FIG. 12 is a detailed configuration diagram of a human detecting apparatus with multiple human component detecting apparatuses according to an exemplary embodiment of the present invention.

FIG. 12 is a detailed configuration diagram of a human detecting apparatus with multiple human component detecting apparatuses according to an exemplary embodiment of the present invention.

Referring to FIG. 12, the human detecting apparatus 1200 includes a determiner 1210, a human head detecting apparatus 1220, a human legs detecting apparatus 1230, and a human torso detecting apparatus 1240. In the present exemplary embodiment, as a main detecting apparatus, the human head detecting apparatus 1220 may be the head detecting apparatus 100 of FIG. 1. Also, the human legs detecting apparatus 1230 and the human torso detecting apparatus 1240 have the same structure as the head detecting apparatus 100.

Each of the human head detecting apparatus 1220, the human legs detecting apparatus 1230, and the human torso detecting apparatus 1240 may include an image processor (not shown), a training DB (not shown) and a sub-window processor (not shown) which respectively have the same function as the image processor 110, the training DB 120, and the sub-window processor 130 of FIG. 1. Thus, detailed description for each element is omitted.

In addition, the human head detecting apparatus 1220 includes a human head classifier obtained from a human head model learned from a feature population, wherein the feature population is extracted from a difference image of positive and negative human samples of a human head stored in a corresponding training DB by a sub-window processor of the human head detecting apparatus 1220, and the difference image is a difference image of positive and negative samples of human head calculated by an image processor of a human head detecting apparatus 1220.

The human legs detecting apparatus 1230 includes a human legs classifier obtained from a human legs model learned from a feature population, wherein the feature population is extracted from a difference image of positive and negative samples of human legs stored in a corresponding training DB by a sub-window processor of the human legs detecting apparatus 1230, and the difference image is a difference image of positive and negative samples of human legs calculated by an image processor of a human legs detecting apparatus 1230.

The human torso detecting apparatus 1240 includes a human torso classifier obtained from a human torso model learned from a feature population, wherein the feature population is extracted from a difference image of positive and negative samples of a human torso stored in a corresponding training DB by a sub-window processor of the human torso detecting apparatus 1240, and the difference image is a difference image of positive and negative samples of a human torso calculated by an image processor of the human torso detecting apparatus 1240.

First, each of the human head detecting apparatus 1220, the human legs detecting apparatus 1230, and the human torso detecting apparatus 1240 respectively detects a human head candidate, a human legs candidate and a human torso candidate from an input image and transmits the same.

Then, the determiner 1210 eliminates false alarms of the human head candidate that is detected from the detected candidates of human head detecting apparatus 1220 and the human torso detecting apparatus based on human body geometry such as respective restriction and scale restriction between human head and torso. Then, the determiner 1210 eliminates false alarms of the human head candidate and human legs candidate according to human body geometry, so as to detect a human head, human legs, a human torso and a portion of a human body from the input image.

The head detecting apparatus 1220 illustrated in FIG. 12 may include the pyramid detecting apparatus 900 of FIG. 9. That is, each of the human head detecting apparatus 1220, the human legs detecting apparatus 1230, and the human torso detecting apparatus 1240 does not include all elements such as a image processor, a training DB, and a sub-window processor, and may jointly use the image processor, a training DB, and sub-window processor.

Figure 13:
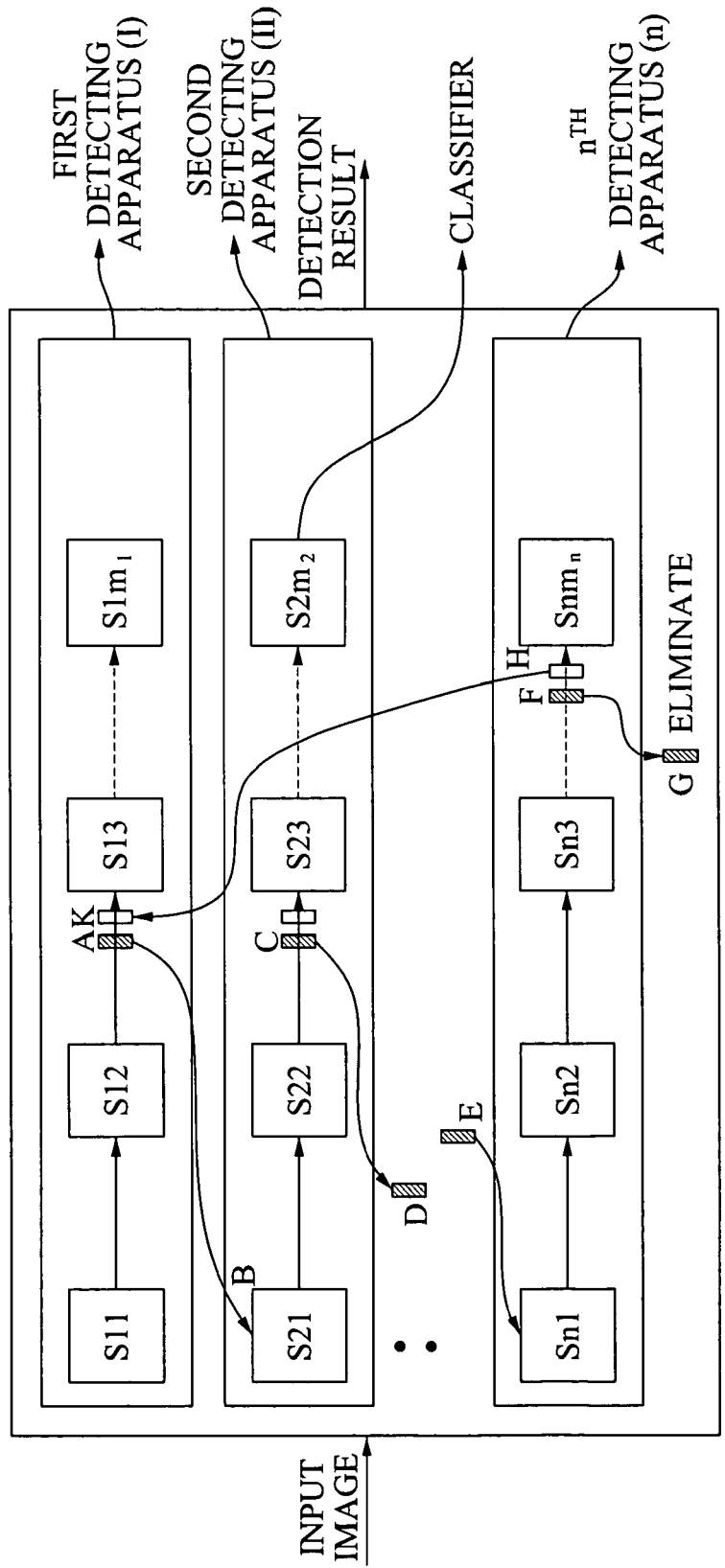
FIG. 13 is a configuration diagram of an object detecting apparatus wherein multiple component detecting apparatus positioned in parallel according to another exemplary embodiment of the present invention.

FIG. 13 is a configuration diagram of an object detecting apparatus 1300 wherein multiple component detecting apparatuses are positioned in parallel according to another exemplary embodiment of the present invention.

Referring FIG. 13, the object detecting apparatus 1300 includes an N component detecting apparatus (I-n) positioned in parallel. Also, the object detecting apparatus 1300 may include an image processor (not shown), a training DB (not shown) and a sub-window processor (not shown), which respectively have the same function as the image processor 110, the training DB 120, and the sub-window processor 130 of FIG. 1. Thus, detailed description for each element is omitted. In the object component detecting apparatus 1300, each of a first to $N^{th}$ component detecting apparatus may either include all of the above-described elements, such as an image processor, a training DB, and a sub-window or include only the pyramid classifier 900 of FIG. 9 while jointly using the image processor, a training DB, and a sub-window processor.

Furthermore, the object component detecting apparatus 1300 may further include a determiner (not shown), and when the object is a human being, the object component detecting apparatus 1300 may eliminate false alarms of a human component based on a detected human component by the first to $N^{th}$ component detecting apparatus, . . . , and N according to human body geometry, so as to determine a human component in a detected image.

A first component detecting apparatus I includes $m_1$ classifiers S11, S12, S13, . . . , $S1m_1$ for a first component, a second component detecting apparatus II includes $m_2$ classifiers S21, S22, S23, . . . , $S2m_2$ and a $N^{th}$ component detecting apparatus n (n=1, 2, 3, . . . , n) includes $m_n$ classifiers Sn1, Sn2, Sn3, . . . , $Snm_n$, wherein $m_1, m_2, . . . , m_n$ are natural numbers.

Operation of the classifier is similar to that of the human component detecting apparatus illustrated in FIG. 12, thus the operation of the classifier is not described. As shown in FIG. 13, the classifier of n component detecting apparatuses of the object detecting apparatus 1300 performs calculating in ascending order. Generally, a calculation amount of a classifier corresponds to a calculation amount of processing the number of features. Thus, the classifier is aligned in an ascending order of the number of the features included in a feature population.

Hereafter, operation of the object detecting apparatus 1300 is described with reference to FIG. 13.

After an image is inputted into the object detecting apparatus 1300, the input image is detected through two front-end classifiers S11 and S12 of the first component detecting apparatus I. That is, the objecting apparatus 1300 operates to point A and obtains a first component candidate of the first component detecting apparatus I. Then, the object detecting apparatus 1300 transmits the first component candidate to the second component detecting apparatus II, that is, operates to point B, and detects the image through two front-end classifiers S11 and S12, that is, operates to point C, thereby obtaining a second component candidate of the second component detecting apparatus II. After that, a determiner (not shown) eliminates false alarms of the first component candidate according to object structure geometry based on the obtained the first component and the second component candidates (operation to point D).

In this manner, the object detecting apparatus 1300 sequentially uses the front-end classifiers of a third to $n-1^{th}$ component detecting apparatus III, . . . , and n−1, a plurality of front-end classifiers of the $n^{th}$ component detecting apparatus n operate by determined component in a previous operation (operation to point E), thereby obtaining $n^{th}$ component candidates, and the determiner eliminates false alarms (operation to point G). Next, in connection with remaining component candidates (operation to point H), the $n^{th}$ component detecting apparatus n transmits the remaining component candidates (operation to point K) to the first component detecting apparatus, and eliminates false alarms through a determiner by detecting via the classifier of the first component detecting apparatus again. Continuously, the third component detecting apparatus III to the $n^{th}$ component detecting apparatus n is sequentially used and the first component detecting apparatus I to the $n^{th}$ component detecting apparatus n is repeatedly used, thus every classifier from the first component detecting apparatus I to the $n^{th}$ component detecting apparatus n is used.

The principle of each component detecting apparatus is based on the following:

initially using a front-end classifier that has the relatively small number of features in a feature population; eliminating most of false alarms with relatively fewer calculations; and gradually using classifiers that have a relatively large number of features in a feature population, thereby improving efficiency and speed of detection.

For example, when the same false alarm is eliminated simply by the first component detecting apparatus I, enabling 50 features to be eliminated may merely need classifiers S11, S12 and S13, and when the same false alarm is eliminated by two front-end classifiers S11 and S12 of the component detecting apparatus I and a classifier S21 of the second component detecting apparatus II, only five features are eliminated as false alarm.

In detection, a component detecting apparatus is switched to another component detecting apparatus according to predetermined threshold value of the number of features that a classifier has.

Although, the threshold value may be set through a different method, a principle of the method may be similar. The front-end classifier that has the relatively small number of features in a feature population may eliminate false alarms through switching between different component detecting apparatuses.

In another exemplary embodiment of the present invention, all the classifiers in the object component detecting apparatus 1300 are used in ascending order of the number of features included in a feature population. Also, when detection is performed using the object component detecting apparatus 1300, a classifier with the relatively small number of features is first used in the object component detecting apparatus 1300 in consideration of the ascending order of the number of features included in the feature population without considering a component detecting apparatus where the classifier belongs.

The present invention is not limited to detection of a human component and may be applied to detection of any object having a predetermined shape, such as animals, plants, buildings, natural sceneries, daily necessities, and the like.

Figure 14:
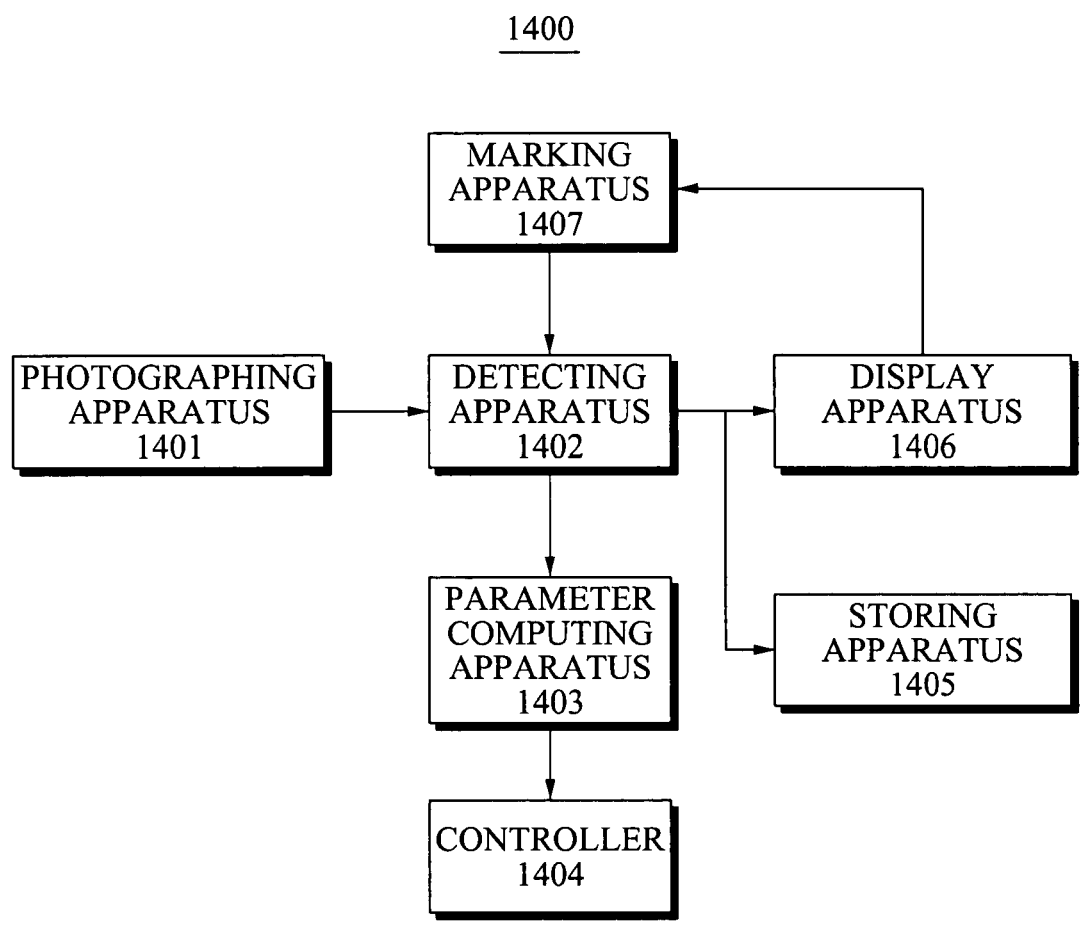
FIG. 14 is a configuration diagram of the image forming system according to an exemplary embodiment of the present invention.

FIG. 14 is a configuration diagram of the image forming system 1400 according to an exemplary embodiment of the present invention.

Referring FIG. 14, the image forming system 1400 includes a photographing apparatus 1401, a detecting apparatus 1402, a parameter computing apparatus 1403, a controller 1404, a storing apparatus 1405, a display apparatus 1406 and a marking apparatus 1407. The image forming system 1400 may be any one of a PAN, TILT, ZOOM (PTZ) camera, a stationary surveillance camera, a digital camera (DC), a mobile phone camera, a digital video (DV) camera, and a personal video recorder (PVR).

The photographing apparatus 1401 is hardware-based, such as a charge coupled device (CCD) or a complementary metal oxide semiconductor (CMOS) device, for sensing and generating an image of the natural sceneries.

In order to track movement of an object, there are provided two methods of providing a position and a scale of a moving region of the object. The first method is an automatic method, wherein the scale and position of an interesting object region that is embedded to object detecting function is extracted. The second method is manual method, wherein a user or an operator may mark an interesting object region on a displayed image (e.g., touch screen). With respect to the automatic method, the object can be automatically detected using the object component detecting method of the present invention. The marking apparatus 1407 provides a marking function to a user or an operator, so that the user or the operator can manually mark an interested object on an image using a pen or a finger.

The detecting apparatus 1402 receives image data from the photographing apparatus 1401 and may accept information of a position and a scale of a marked interesting object, for example the marked interesting object may be roughly marked by a user. The detecting apparatus 1402 detects an accurate position where an object exists, and the parameter computing apparatus 1403 computes and generates parameters that adjusts the status of an image forming system according to the detected. It should be noticed that the marking apparatus 1407 is optional when the first method of providing a position and a scale of an object, namely the automatic method, is used. When a plurality of tracking objects is selected, namely, for example, when a plurality of objects are tracked, the user may modify a tracking object that the image forming system of the present invention automatically selects.

Figure 15:
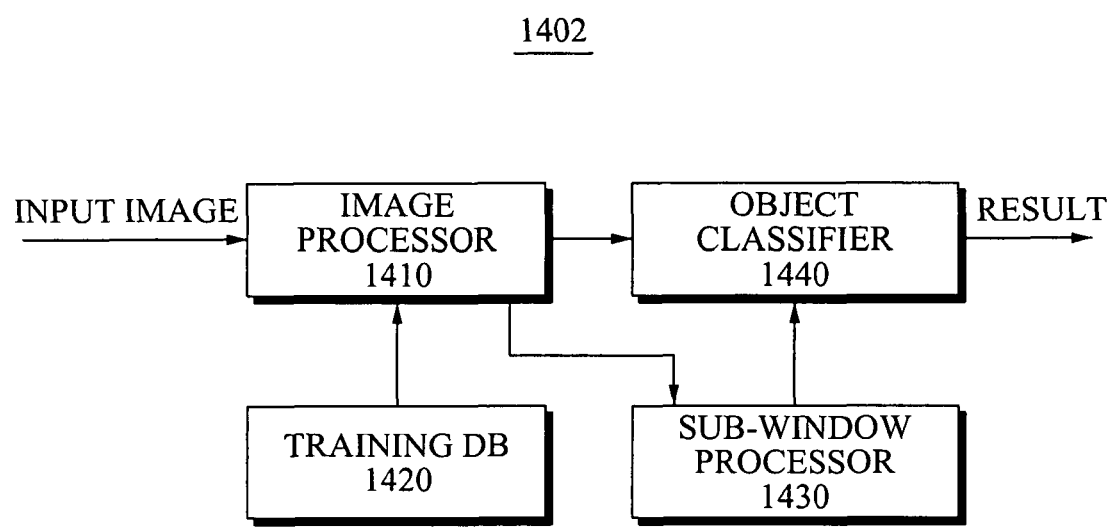
FIG. 15 is a configuration diagram of a detecting apparatus of FIG. 14.

FIG. 15 is a configuration diagram of the detecting apparatus 1402 of FIG. 14. Referring to FIG. 15, the detecting apparatus 1402 includes an image processor 1410, a training DB 1420, a sub-window processor 1430, and an object classifier 1440.

The image processor 1410 calculates difference images outputted from the photographing apparatus 1401 using the method described with reference to FIG. 2. The training DB 1420 stores positive and negative samples of a variety of objects, such as animals, plants, buildings, natural sceneries, daily necessities, and the like. The sub-window processor 1430 extracts a feature from a difference image of the positive and negative samples of the objects stored in the training DB, where the difference images are calculated by the image processor 1410 using the feature extracting method described with reference to FIG. 6.

The object classifier 1440 detects an object region using an object model learned from an extracted feature population based on the calculated difference image of an input image to be detected. The object model is learned by using the same method as the method of learning a head model in the present invention.

The detecting apparatus 1402 may further include a transmitter (not shown). The transmitter transmits either a detected result image from the object classifier 1440 or a selected image by a user in the marking apparatus 1407.

The detecting apparatus 1402 may not include the training DB 1420 and the sub-window processor 1430, and may preset classified models of predetermined objects, namely object models in the object classifier 1440. The object classifier 1440 may adjust and selectively use the classified object model according to a user's desired type of an object.

The controller 1404 controls status of the image forming system through either adjusting operation of rotation, tilting, zooming, and selecting a focus region of a PTZ camera or adjusting zoom and focus of the stationary surveillance camera, DC, DV camera, and PVR. The controller 1404 receives status parameters for adjusting status of the image forming system from the status parameter computing apparatus 1403.

The detecting apparatus 1402 may provide position and scale information at a new time point or in a new frame data. The controller 1404 controls the status of the image forming system according to the status parameters through adjusting rotation and tilting, so as to enable the object to be in the central region of an image. Also, the controller 1404 selects an interested object region through selecting a focus region and focus to the interested object region through zooming, so as to obtain a detail component of a moving object with high image quality.

In the operation of selecting the focus region, the controller 1404 may control the image forming system to select, as a focal basis, a new region where the object exists, so as to focus on the new region. Furthermore, when the photographing apparatus 1401 select a focus region, the controller 1404 may control to select the central region of the image as a default image focus region, and also a new region where the object is existing as an image focus region. Also, the controller may dynamically adjust zoom in/out, focal distance, rotation or tilt parameters based on image data information of the focus region, so as to obtain better image forming effect.

For a portable electronic device, such as a DC, a DV camera and a PVR, a user may manually adjust its status to enable an interesting object to be in a center of an image. The controller according to the exemplary embodiment of the present invention may dynamically adjust zoom in/out and focus parameters based on a detection result and parameters provided by the status parameter computing apparatus.

The storing apparatus 1405 stores an image or frequency and the display apparatus 1406 displays the image and the frequency to a user.

The detecting apparatus 1402 according to the exemplary embodiment of the present invention may be implemented in software, which is applied to an embedded system of an image forming system and a controller. The embedded image forming system may receive a frequency as an input and transmit a command to a controller of the image forming apparatus to adjust the status of a photographing apparatus, a focus region or a mirror, and the like.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An image forming system comprising:
   a photographing sensor configured to capture an image of a physical object;
   a detector configured to use an object model to detect a region of the image that includes the physical object, wherein the object model is trained by an image of the physical object, wherein the image of the physical object is extracted from a difference image by use of at least one sub-window, wherein each difference image is either a positive or a negative image of the physical object, and wherein each difference image corresponds to a difference between a first image of the physical object and a second image of the physical object;
   a status parameter computing processor configured to compute status parameters, based on the region where the detected physical object exists in the image of the physical object, so as to enable the physical object to be in the central region of the image;
   a controller configured to receive the status parameters, and adjust the status of the image;
   a memory device configured to store the image of the physical object;
   a display configured to display the image of the physical object; and
   a sub-window processor configured to use at least one sub-window to extract the image of the physical object from the difference image,
   wherein the sub-window processor is configured to:
   create double windows by simultaneously varying width and height of two windows, in an adjustable scale according to the image scale;
   vary the width and height of the double windows, by using consistent zoom parameters, and slide the double windows on the image, so as to capture a wide-range hidden pattern according to the scale, wherein the double windows are slid relative to each other in a horizontal direction or in a vertical direction, in order to capture a wide-range hidden pattern.

2. The system of claim 1 further comprising:
a user interface, including a touch screen, configured to enable a user to indicate a region including the physical object, and to provide the indication to the detector.

3. The system of claim 1, wherein the controller is configured to control at least one of the following operations: rotation, tilting, zooming, and selecting a focus region according to the status parameters.

4. The system of claim 1, wherein the controller is configured to select, as a focus region, a new region where the physical object exists.

5. The system of claim 1, wherein the controller is configured to make the central region of the image as a default focus region, dynamically select a new region where the physical object exists as a focus region, and control status parameters of zoom, focal distance, rotation, or tilt, based on image information of the focus region.

6. The system of claim 1, wherein the sub-window processor is configured to:
create a single window by sliding the single window on a training image, while varying its width and height in an adjustable scale according to an image scale.

7. An image forming system comprising:
a photographing sensor configured to capture an image of a physical object;
a detector configured to use an object model to detect a region of the image that includes the physical object, wherein the object model is trained by an image of the physical object, wherein the image of the physical object is extracted from a difference image by use of at least one sub-window, wherein each difference image is either a positive or a negative image of the physical object, and wherein each difference image corresponds to a difference between a first image of the physical object and a second image of the physical object;
a status parameter computing processor configured to compute status parameters, based on the region where the detected physical object exists in the image of the physical object, so as to enable the physical object to be in the central region of the image;
a controller configured to receive the status parameters, and adjust the status of the image;
a memory device configured to store the image of the physical object;
a display configured to display the image of the physical object; and
a sub-window processor configured to use at least one sub-window to extract the image of the physical object from the difference image,
wherein the sub-window processor is configured to:
create triple windows by sliding three connected windows on a sample;
wherein the triple windows have identical width and height, while varying their scales in order to capture a wide-range pattern according to the scale; and
wherein a second window of the triple windows captures convex and concave contours from a movement of a first window and a third window.

8. The system of claim 7, wherein there are a plurality of kinds of triple windows, including:
a first kind of triple windows, comprising a horizontal layout of the three windows, wherein the second window is configured to slide horizontally and relatively between the first and third windows, and
a second kind of triple windows, comprising a vertical layout of the three windows, wherein the second window is configured to slide vertically and relatively vertically between the first and the third windows.

9. The system of claim 7 further comprising:
a user interface, including a touch screen, configured to enable a user to indicate a region including the physical object, and to provide the indication to the detector.

10. The system of claim 7, wherein the controller is configured to control at least one of the following operations: rotation, tilting, zooming, and selecting a focus region according to the status parameters.

11. The system of claim 7, wherein the controller is configured to select, as a focus region, a new region where the physical object exists.

12. The system of claim 7, wherein the controller is configured to make the central region of the image as a default focus region, dynamically select a new region where the physical object exists as a focus region, and control status parameters of zoom, focal distance, rotation, or tilt, based on image information of the focus region.

* * * * *